United States Patent
Goto et al.

(10) Patent No.: US 10,323,764 B2
(45) Date of Patent: Jun. 18, 2019

(54) VALVE DEVICE

(71) Applicant: TOYOTA JIDOSHA KABUSHIKI KAISHA, Toyota-shi, Aichi-ken (JP)

(72) Inventors: Shintaro Goto, Nisshin (JP); Shinichi Ito, Anjo (JP); Masashi Kato, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/461,021

(22) Filed: Mar. 16, 2017

(65) Prior Publication Data
US 2017/0276255 A1 Sep. 28, 2017

(30) Foreign Application Priority Data
Mar. 23, 2016 (JP) .................. 2016-059274

(51) Int. Cl.
| F16K 31/06 | (2006.01) |
| F16K 27/00 | (2006.01) |
| F16K 27/02 | (2006.01) |
| F16K 27/04 | (2006.01) |

(52) U.S. Cl.
CPC .......... *F16K 27/003* (2013.01); *F16K 27/029* (2013.01); *F16K 27/048* (2013.01); *F16K 31/0675* (2013.01)

(58) Field of Classification Search
CPC .... F16K 27/029; F16K 27/003; F16K 27/048; F16K 31/0675
USPC .......................................... 137/884; 251/367
See application file for complete search history.

(56) References Cited

U.S. PATENT DOCUMENTS

| 6,216,725 B1 * | 4/2001 | Matarai | F15B 13/0817 137/377 |
| 6,715,510 B2 * | 4/2004 | Herbert | F15B 13/0814 137/884 |
| 7,055,549 B2 * | 6/2006 | Flynn | F01L 9/02 123/198 F |
| 7,073,825 B2 * | 7/2006 | Takada | F16L 37/144 137/884 |

(Continued)

FOREIGN PATENT DOCUMENTS

| CN | 1266954 A | 9/2000 |
| DE | 102013203193 A1 | 8/2014 |

(Continued)

*Primary Examiner* — Ian G Paquette
(74) *Attorney, Agent, or Firm* — Oliff PLC

(57) ABSTRACT

A valve device includes: a valve body having assembly holes; solenoid components configured such that a first part is inserted into each assembly hole; and a fixing member fixed to the valve body. An engagement groove is provided in an outer circumferential surface of each solenoid component in a direction intersecting an axial center of the solenoid component. Each engagement groove is provided to a portion of the first part that is located outside the assembly hole when the first part is inserted in the assembly hole. The fixing member includes locking portions. Side walls of each engagement groove are engaged with each locking portion so as to set a position in an axial direction of each solenoid component. Each locking portion is engaged with a groove bottom of each engagement groove so as to set a phase around the axial center of each solenoid component.

4 Claims, 4 Drawing Sheets

(56) References Cited

U.S. PATENT DOCUMENTS

| | | | |
|---|---|---|---|
| 8,459,301 B2 * | 6/2013 | Lorch | ............... E03C 1/021 |
| | | | 137/15.05 |
| 8,833,396 B2 * | 9/2014 | Kato | ............. F15B 13/0842 |
| | | | 137/884 |
| 2014/0196797 A1 | 7/2014 | Dietel et al. | |
| 2016/0312907 A1 * | 10/2016 | Mierendorf | ............. F16K 7/17 |

FOREIGN PATENT DOCUMENTS

| | | |
|---|---|---|
| JP | 2002-156063 A | 5/2002 |
| JP | 2007-187292 A | 7/2007 |
| JP | 2011-144898 A | 7/2011 |

* cited by examiner ptions, drawings and abstract is incorporated herein by reference in its entirety.

VALVE DEVICE

INCORPORATION BY REFERENCE

The disclosure of Japanese Patent Application No. 2016-059274 filed on Mar. 23, 2016 including the specification, drawings and abstract is incorporated herein by reference in its entirety.

BACKGROUND

1. Technical Field

The present disclosure relates to a valve device, and particularly relates to improvement of a valve device in which solenoid components are assembled into assembly holes provided to a valve body.

2. Description of Related Art

Japanese Patent Application Publication No. 2002-156063 discloses a valve device configured such that multiple solenoid components are assembled in parallel into multiple assembly holes that are provided to a valve body, and rectangular locking portions provided to a fixing member are engaged with engagement grooves formed in outer circumferential surfaces of the solenoid components, thereby retaining the multiple solenoid components.

SUMMARY

In the above valve device, positions in axial directions of the solenoid components are specified. However, there are gaps between groove bottoms of the engagement grooves of the solenoid components and the locking portions of the fixing member; thus, phases of the axial centers of the solenoid components might vary in a direction around the axial centers that are directions intersecting the axial directions among the solenoid components, or the phases of the axial centers might change around the axial centers. The locking portions are engaged with both sides of each solenoid component relative to the axial center thereof, and thus it is technically difficult to eliminate the gap between the groove bottom of each engagement groove and each locking portion. For example, in the case of a solenoid valve integrally equipped with a valve part in which a valve element such as a spool is housed, a high accuracy in phase around the axial center is required in relation with a coupling port and others.

The present disclosure provides a valve device capable of setting axial positions of solenoid components and phases around axial centers thereof with a high accuracy in a simple and inexpensive method.

A valve device includes: a valve body having assembly holes; solenoid components being configured such that a first part that is a part of each solenoid component is inserted into each assembly hole; and a fixing member fixed to the valve body. An engagement groove is provided in an outer circumferential surface of each solenoid component in a direction intersecting an axial center of the solenoid component. Each engagement groove is provided to a portion of the first part of each solenoid component that is located outside the assembly hole when the first part is inserted in the assembly hole. The fixing member includes locking portions. Each of the locking portions is configured to be inserted into each engagement groove. Side walls of each engagement groove are engaged with each locking portion so as to set a position in an axial direction of each solenoid component. Each locking portion is engaged with a groove bottom of each engagement groove so as to set a phase around the axial center of each solenoid component.

In such a valve device, the locking portions of the fixing member are inserted into the engagement grooves provided in the outer circumferential surfaces of the solenoid components so as to be engaged with the side walls of the engagement grooves, thereby setting the axial positions of the solenoid components, and also so as to be engaged with the groove bottoms of the engagement grooves, thereby setting the phases around the axial centers of the solenoid components. This means that simply by inserting a single locking portion into a single engagement groove, it is possible to set the positions in the axial directions and the phase around the axial centers of the solenoid components at the same time with a high accuracy. It is only necessary to fix the fixing member whose locking portions are inserted in the engagement grooves to the valve body, thus carrying out the fixation of the solenoid components in a simple and inexpensive manner.

In a second aspect according to the above aspect, the valve body may include a stepped portion that is cutout from an engagement groove side in a radial direction of each of the assembly holes such that the engagement groove is exposed outside when the solenoid components are assembled to the valve body. The stepped portion may be cutout such that an upper surface of the stepped portion is located at a lower position than the groove bottom of the engagement groove when the solenoid components are assembled to the valve body through the fixing member.

According to such a configuration, the valve body is provided with a relief step in a cutout shape, and the fixing member is disposed thereto. Since the level of the upper surface of the relief step is set at a position lower than the groove bottom of each engaging groove, and thus the locking portions of the fixing member are securely engaged with the groove bottoms of the engagement grooves, thereby setting the phases around the axial centers. Parts of the solenoid components on an opposite side to the engagement grooves are supported around the axial centers of the solenoid components by the relief step, and thus a support range in the axial direction in which the solenoid components are supported by the valve body becomes greater, thus stabilizing postures of the solenoid components, thereby fixing the solenoid components to the valve body with a higher positioning accuracy.

In a third aspect according to the above aspect, a front end of each locking portion may be provided in a straight line. The groove bottom of each engagement groove may be provided in a straight line in a longitudinal direction of the engagement groove may be engaged with the groove bottoms of the engagement grooves in a straight line.

According to such a configuration, the front ends of each locking portion is provided in a straight line, and the groove bottom of each engagement groove is provided in a straight line, so that the front ends of the locking portions are engaged with the groove bottoms of the engagement grooves in a straight line; therefore, it is possible to appropriately set the phases around the axial centers of the solenoid components.

In a fourth aspect according to the above aspect, the fixing member may be a flat-platy fixing plate. The fixing member may be fixed to the valve body such that a position of the fixing member in a planar direction parallel with the fixing plate is adjustable. An edge of the fixing plate may include a front end surface of each locking portion. The front end surface of each locking portion may have higher profile accuracy of portions other than the front end surface in the edge.

According to such a configuration, a fixing plate in a simple flat-platy shape is used as the fixing member, and is fixed to the valve body in a manner as to be adjustable in a parallel direction with the fixing plate; therefore, the fixing plate can be produced by press-punching or the like in a simple and inexpensive manner, and securely engaging the locking portions with the groove bottoms of the engagement grooves. The front end surfaces of the locking portions are composed of the edge of the fixing plate, and front end portions of the front end surfaces are machined through a post-processing such as a shaving press and cutting, for example, so as to have a high profile accuracy; thus burrs and/or sags due to press-punching, for example, are removed; and the front ends are engaged with the groove bottoms of the corresponding engagement grooves, thereby setting the phases around the axial centers of the solenoid components with a high accuracy.

In a fifth aspect according to the above aspect, the valve body may be provided with the assembly holes such that the axial directions of the assembly holes are parallel with one another. The valve body may be provided with the assembly holes such that the axial centers of the assembly holes are arranged in a straight line. The assembly holes may be configured such that the solenoid components are assembled into the assembly holes in parallel. The solenoid components may be provided with the engagement grooves in a straight line in a direction vertical to the axial centers of the solenoid components. The fixing member may be a flat-platy fixing plate provided with the locking portions arranged in a straight line along the edge. The locking portions may be locked to the engagement grooves of the solenoid components.

According to such a configuration, the multiple assembly holes are formed in the valve body, the multiple solenoid components are assembled into the holes in parallel, and the multiple solenoid components are positioned and fixed by the flat-platy fixing plate. Hence, the number of components can be reduced, and the fixing plate can be produced by press-punching, etc., thus configuring the valve device having the multiple solenoid components in a simple and inexpensive manner as a whole.

Because the fixing plate is provided with the multiple locking portions in a straight line along the edge, and the locking portions are locked to the engagement grooves provided to the multiple solenoid components in a straight line in a direction vertical to the axial centers of the solenoid components respectively; therefore, it is possible to set the phases around the axial centers of the multiple solenoid components with a high accuracy. Specifically, because of the simple arrangement shape of the multiple locking portions that are arranged in a straight line along the edge, it is easy to secure a mutual positioning accuracy among the locking portions. In a case where the multiple solenoid components are fixed to different fixing members each of which is independently configured, the positioning accuracy among the solenoid components might vary due to errors in dimension and in fixation among the multiple different fixing members. To the contrary, the fixing plate is disposed across the multiple solenoid components, thereby suppressing variation in positioning accuracy among the individual solenoid components.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, embodiments of the present disclosure will be described in details with reference to drawings. In the following embodiment, the drawings are appropriately simplified or deformed for convenience of explanation, and a dimensional ratio, a shape, and others of each component are not always precisely illustrated.

Figure 1:
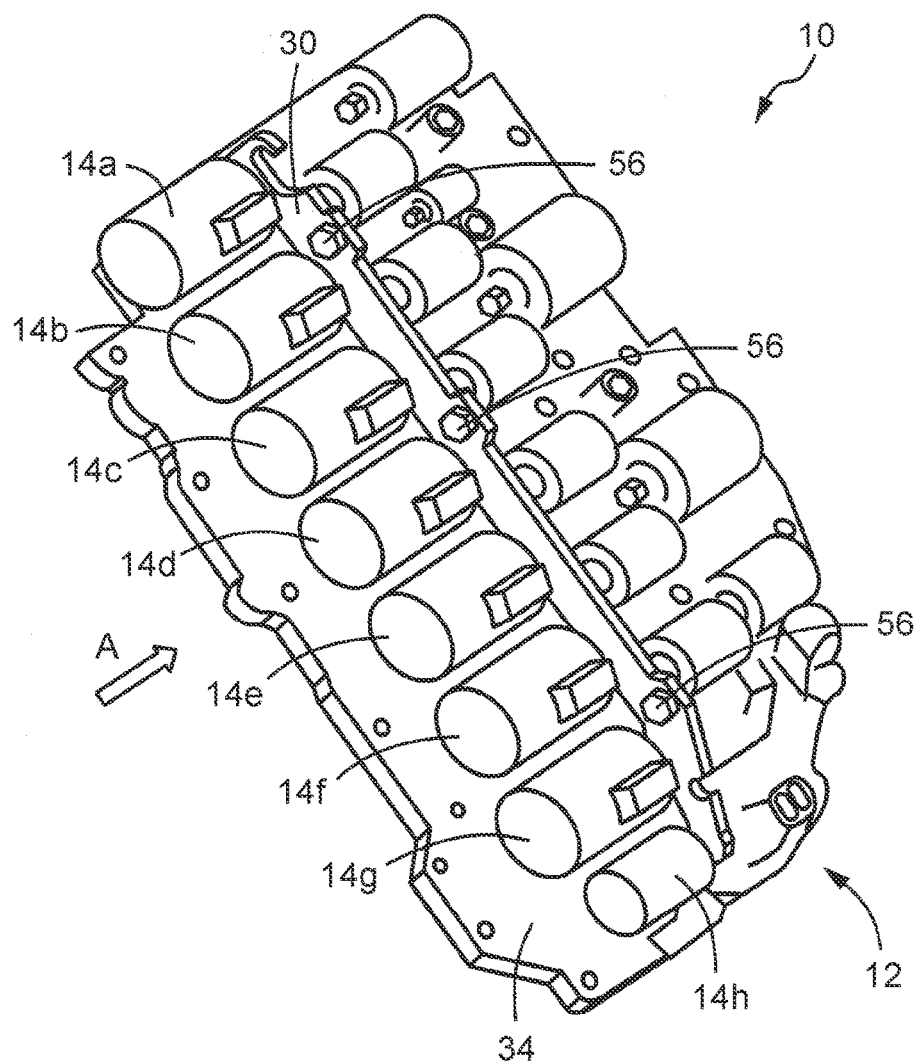
FIG. 1 is a schematic perspective view showing an example of a valve device to which the present disclosure is applied.
Figure 2:
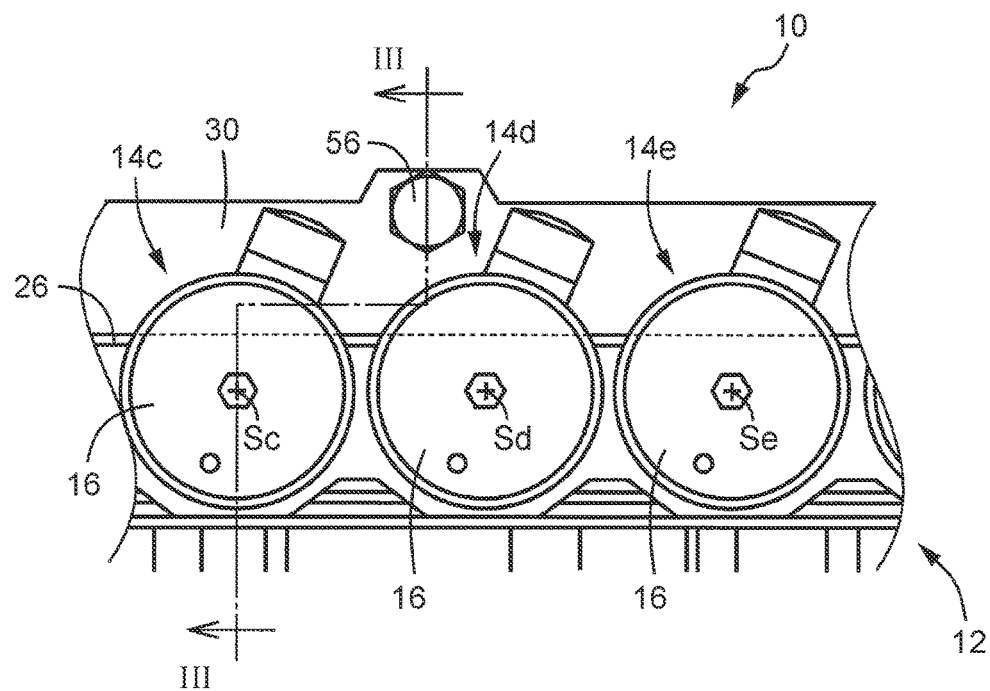
FIG. 2 is a partially enlarged front view as viewed in an arrow A direction in FIG. 1.
Figure 3:
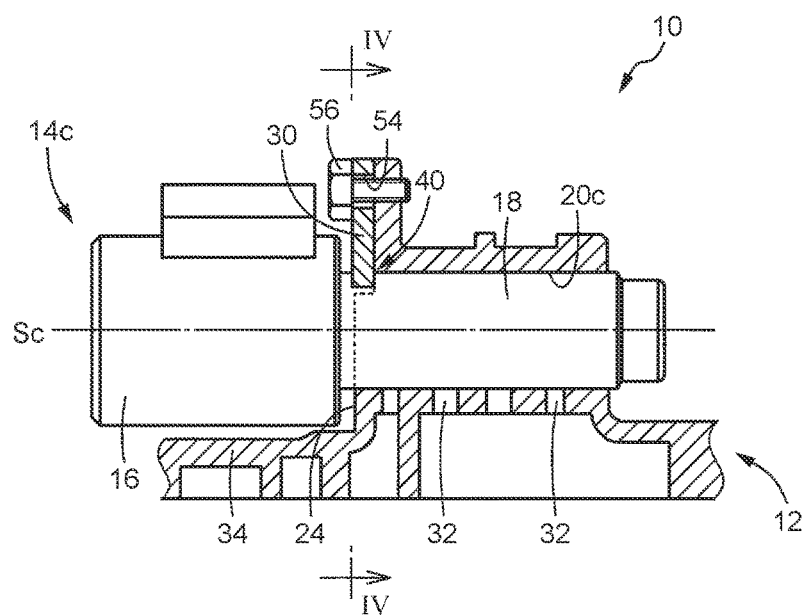
FIG. 3 is a cross-sectional view taken along line in FIG. 2.
Figure 4:
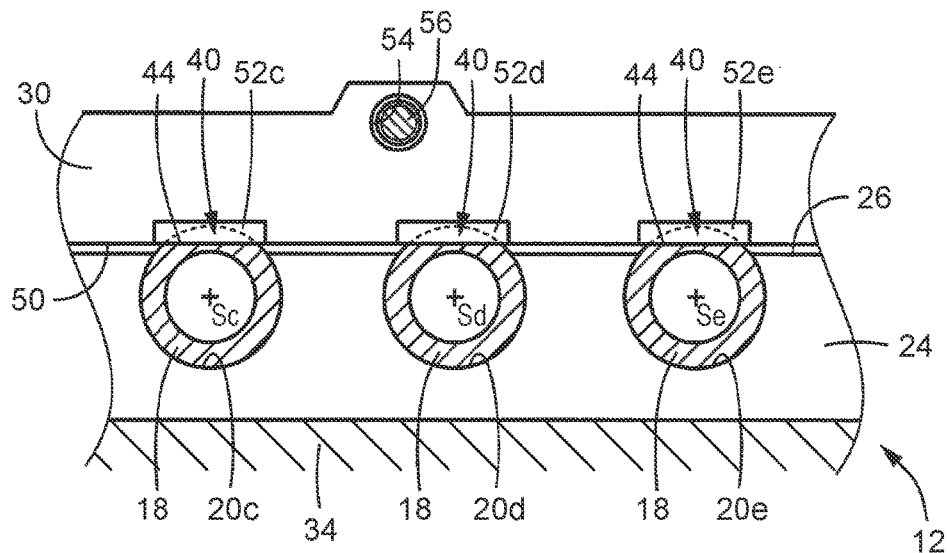
FIG. 4 is a cross-sectional view taken along line IV-IV in FIG. 3.

FIG. 1 is a schematic perspective view showing a valve device 10 to which the present disclosure is applied, FIG. 2 is a partially enlarged front view as viewed in an arrow A direction in FIG. 1, FIG. 3 is a cross-sectional view taken along line in FIG. 2, and FIG. 4 is a cross-sectional view taken along line IV-IV in FIG. 3. In the following description, postures as shown in FIG. 2 and FIG. 3 are defined as a reference, positional relations or the like among parts and components will be described based on an assumption that an up-down direction in the drawings corresponds to an up-down direction or a vertical direction, and a right-left direction in the drawings corresponds to a horizontal direction, but it should be noted that this does not mean an actual installation posture into a vehicle.

Figure 6:
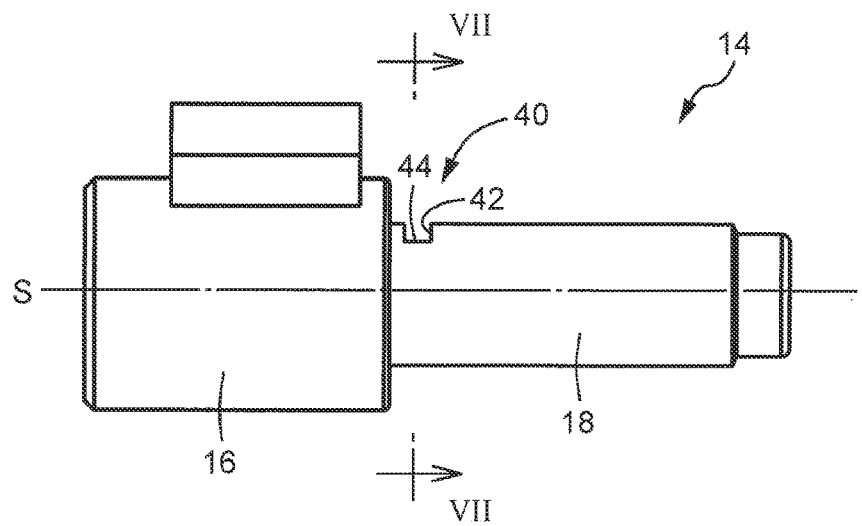
FIG. 6 is a side view showing a linear solenoid valve of the valve device in FIG. 1 alone.
Figure 7:
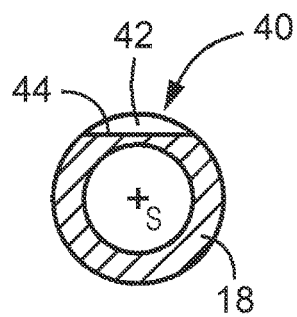
FIG. 7 is a cross-sectional view taken along line VII-VII in FIG. 6, and is a drawing in which a valve element and others in the inside are omitted to be illustrated in the drawing.

The valve device 10 is used for a hydraulic control circuit of a vehicle automatic transmission that carries out gear-shifting by using multiple hydraulic actuators, and multiple (eight in the embodiments) linear solenoid valves 14a to 14h (hereinafter, referred to simply as linear solenoid valves 14, unless otherwise distinguished) are assembled to a single valve body 12. The linear solenoid valves 14 correspond to solenoid components, and each linear solenoid valve 14 is formed in a stepped cylindrical shape having a large-diameter part 16 and a small-diameter part 18 that are concentric to an axial center S. Each large-diameter part 16 houses therein a solenoid for valve-driving that generates a predetermined electromagnetic force when the solenoid is excited by a duty control of excitation current or the like, and each small-diameter part 18 is a valve part housing therein a valve element such as a spool, a return spring, and the others. Each linear solenoid valve 14 is a regulated valve that continuously regulates oil pressure by urging the valve element in an axial direction (direction parallel with the axial center S) at a predetermined electromagnetic force, for example. FIG. 6 is a side view showing the linear solenoid valve 14 alone, and is a drawing as viewed from the left side, that is, from the large-diameter part 16 side in FIG. 6 corresponds to a front view as viewed in an arrow A direction in FIG. 1. FIG. 7 is a cross-sectional view taken along line VII-VII in FIG. 6 in which a valve element and others in the inside are omitted to be illustrated in the drawing. The axial center S is individually distinguished by using reference numerals Sa to Sh in a case where the axial center of each linear solenoid valve 14 are individually explained, but this is referred to simply as the axial center S, unless otherwise distinguished.

Figure 5:
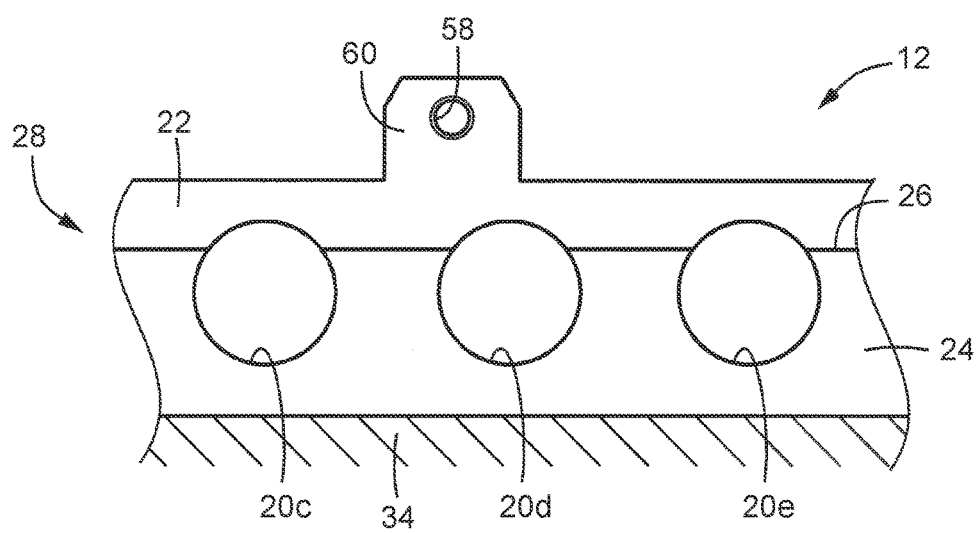
FIG. 5 is a cross-sectional view of a valve body taken along line IV-IV in FIG. 3.

The valve body 12 is provided with multiple (eight in the embodiments) assembly holes 20a to 20h (referred to simple as assembly holes 20, unless otherwise distinguished) used for assembling the linear solenoid valves 14a to 14h. FIG. 5 is a cross-sectional view of the valve body 12 taken along line IV-IV in FIG. 3, and corresponds to FIG. 2 and FIG. 4. The assembly holes 20 are through-holes each having a circular cross section, and the small-diameter part 18 of each linear solenoid valve 14 is inserted from an opening on the left of FIG. 3 in a manner as to be movable in the axial direction and rotatable around the axial center S. A diameter dimension of each assembly hole 20 is slightly greater than a diameter dimension of each small-diameter part 18 so that the small-diameter part 18 is fitted into the assembly hole 20 with almost no gap therebetween. The small-diameter part 18 is an example of a first part of each solenoid component.

The above multiple assembly holes 20 are so formed as to open to an assembly surface 28. The assembly surface 28 includes an upper end surface 22, a lower end surface 24, and a stepped portion 26. The upper end surface 22 and the lower end surface 24 are parallel with each other. The upper end surface 22 and the stepped portion 26 are flat surfaces. The stepped portion 26 is substantially vertical to the upper end surface 22, and is also substantially vertical to the lower end surface 24. All the assembly holes 20 are so disposed as to be vertical to the upper end surface 22 and the lower end surface 24, and the assembly holes 20 are so arranged as to be parallel with one another. A series of six assembly holes 20a to 20f are arranged in a straight line in a horizontal direction (the right-left direction in FIG. 5). The multiple linear solenoid valves 14 are positioned and fixed to the valve body 12 by a single fixing plate 30 with the small-diameter parts 18 inserted in the assembly holes 20. The linear solenoid valves 14a to 14f whose small-diameter parts 18 are respectively inserted in the six assembly holes 20a to 20f are so assembled in parallel as to be arranged in a straight line in parallel with one another in the horizontal direction, in the same manner as the assembly holes 20a to 20f. The valve body 12 is provided with multiple oil passages 32 opening to inner wall surfaces of the assembly holes 20 so that the oil passages 32 are communicated with multiple coupling ports (not illustrated in the drawings) formed in the small-diameter parts 18. A base part 34 is so provided as to outwardly extend from a lower end of the assembly surface 28 in a substantially horizontal direction, and there is provided a predetermined gap between the base part 34 and the large-diameter part 16 of each linear solenoid valve 14; therefore, assembly positions and postures of the linear solenoid valves 14 relative to the valve body 12 are specified mostly by the assembly holes 20 and the fixing plate 30.

At a predetermined position of the small-diameter part 18 in the vicinity of the large-diameter part 16 of each linear solenoid valve 14, an engagement groove 40 is so provided as to extend in a straight line in a direction orthogonal to the axial direction in which the axial center S extends. The engagement groove 40 is located more outward than the upper end surface 22 in the axial direction of the assembly hole 20 in a state in which the small-diameter part 18 of each linear solenoid valve 14 is assembled in the corresponding assembly hole. In the present embodiment, each small-diameter part 18 is inserted into each corresponding assembly hole 20 in such a manner that one side wall of a pair of side walls 42 of each engagement groove 40, which is more distant from the large-diameter part 16, substantially coincides with the upper end surface 22. As apparent from FIG. 4 that is a cross-sectional view taken along line IV-IV in FIG. 3, a fixing plate 30 is engaged with the engagement grooves 40. Each engagement groove 40 has a rectangular cross section or an inversely-trapezoidal cross section having a wider width toward an opening thereof, is provided with the pair of side walls 42 and a groove bottom 44, and is formed by cutting or the like. As apparent from FIG. 6 and FIG. 7, the groove bottom 44 is substantially parallel with the axial center S in the width direction of the engagement groove 40, is so provided as to be in a straight line in a longitudinal direction of the engagement groove 40, that is, in a circumferential direction of the small-diameter part 18, and is composed of a single flat plane. A groove depth of each engagement groove 40 is defined so as not to extend through a side wall of a case of the small-diameter part 18. Each engagement groove 40 having a right angle relative to the axial center S is positioned in a single plane substantially parallel with the assembly surface 28 by inserting each small-diameter part 18 into each corresponding assembly hole 20 vertically arranged to the assembly surface 28.

Figure 8:
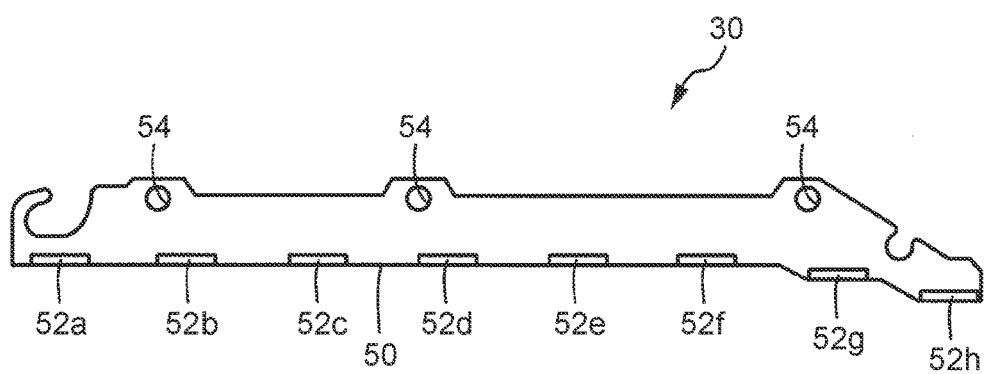
FIG. 8 is a front view showing a fixing plate of the valve device in FIG. 1 alone.

The fixing plate 30 corresponds to a fixing member. FIG. 8 is a front view showing the fixing plate 30 alone, and corresponds to a drawing as viewed in the arrow A direction in FIG. 1. The fixing plate 30 is composed of a flat-platy metallic member having a substantially constant plate thickness, and an entire shape thereof is produced into be a longitudinal shape by press-punching. Multiple (eight in the present embodiment) locking portions 52a to 52h (hereinafter, referred to simply as locking portions 52, unless otherwise distinguished) are provided along one side edge of the longitudinal shape, that is, a lower side edge 50 in FIG. 8. The side edge 50 includes a straight portion extending in a straight line in a substantially horizontal direction, and a stepwise portion having different levels formed in a stepwise shape; and the straight portion is provided with the locking portions 52a to 52f with the same intervals as those of the assembly holes 20a to 20f. The stepwise portion is so provided as to correspond to positions of the assembly holes 20g, 20h, and the locking portions 52g, 52h are provided to respective horizontal portions of the stepwise portion. Press-punching brings a poor profile accuracy because of generation of burrs, sags, and the like in an outer circumferential surface, that is, a sheared surface of each locking portion 52; therefore, in the present embodiment, a post-processing such as shaving press is employed so as to secure an appropriate profile accuracy of a front end surface and both side surfaces of each locking portion 52. Here, the word "profile accuracy" means the degree of surface roughness such that one surface is smoother than the other surface in a case where the profile accuracy of the one surface is higher than the other surface.

The fixing plate 30 is further provided with multiple (three in the embodiments) fixing holes 54 as fixing portions for fixing the fixing plate 30 to the valve body 12. The fixing holes 54 are arranged with intervals therebetween along an upper side edge on an opposite side to the side edge 50 where the locking portions 52 are provided, and bolts 56 inserted through the fixing holes 54 are screwed into screw holes 58 of the valve body 12 so as to integrally fix the fixing plate 30 to the valve body 12. As shown in FIG. 5, each screw hole 58 is formed in each corresponding projection 60 extending upward from the upper end surface 22 of the assembly surface 28, and the fixing plate 30 is fixed in a manner as to be substantially in tight contact with the upper end surface 22 in parallel therewith. Each fixing hole 54 is a circular hole having a greater diameter than that of a screw portion of each bolt 56, and the fixing position of the fixing plate 30 can be adjusted in a direction parallel with the fixing plate 30, that is, in a direction along the upper end surface 22. Through this, regardless of error in dimension of each part or the like, the fixing plate 30 can be fixed to the valve body 12 while a front end of each locking portion 52 is engaged with (abuts against) the groove bottom 44 of each corresponding engagement groove 40. Instead of providing the valve body 12 with the screw holes 58, nuts may be screwed thereto so as to be fastened, or long holes extending long in the up-down direction may be provided as the fixing holes 54. It may also be possible to provide the valve body 12 with long holes so that the fixing position of the fixing plate 30 becomes adjustable.

The respective locking portions 52a to 52h of the fixing plate 30 are inserted into and engaged with the corresponding engagement grooves 40 of the linear solenoid valves 14a to 14h, thereby positioning the linear solenoid valves 14a to 14h into predetermined postures to be integrally fixed to the valve body 12. Specifically, as shown in FIG. 4, in a phase in which each engagement groove 40 opens upward in the drawing in a direction around the axial center S and each groove bottom 44 thereof is arranged to be substantially horizontal, the front end of each locking portion 52 and each corresponding groove bottom 44 are substantially in tight contact with each other along a straight line across the entire longitudinal length of the engagement groove 40, thereby setting the phase of each linear solenoid valve 14 around the axial center S. Each locking portion 52 is engaged with the side walls 42 of each corresponding engagement groove 40, thereby setting the position in the axial direction of each linear solenoid valve 14.

Each engagement groove 40 has a wider groove width than a plate thickness of each locking portion 52 so as to have a predetermined play therebetween, and the play is defined within an allowable range of variation in axial positions of the linear solenoid valves 14. Positioning of the linear solenoid valves 14 around the axial centers S may vary within a predetermined allowable range. Therefore, it is not always necessary to bring all the front ends of the locking portions 52a to 52h to be engaged with (abut against) the groove bottoms 44 of the engagement grooves 40 of all the corresponding linear solenoid valves 14a to 14h, and there may be gaps between some or all of the groove bottoms 44 of the engagement grooves 40 of the linear solenoid valves 14 and the front ends of the corresponding locking portions 52.

The stepped portion 26 of the assembly surface 28 allows the fixing plate 30 to be fixed to the valve body 12 in a state in which the locking portions 52 of the fixing plate 30 are engaged with the engagement grooves 40 exposed to the outside of the assembly holes 20. The stepped portion 26 corresponds to a relief step in a cutout shape. As shown in FIG. 4, in a state in which the front end of each locking portion 52 is engaged substantially in parallel with (abuts against) the groove bottom 44 of each corresponding engagement groove 40 so as to position the phase around the axial center S of each linear solenoid valve 14, a level of the upper surface of the stepped portion 26 is defined to be at a position lower than the groove bottom 44 of the engagement groove 40 so as not to interfere with the fixing plate 30, and each assembly hole 20 is disposed at a position across the upper and lower end surfaces 22, 24 with the stepped portion 26 located therebetween. In order to secure a support range of each small-diameter part 18, a width dimension, that is, a projecting dimension in the left direction in FIG. 3 of the stepped portion 26 is defined to be a maximum dimension within a range where the lower end surface 24 does not interfere with the large-diameter part 16. Such a stepped portion 26 is formed by removing an upper portion of the stepped portion 26 through a post-processing such as cutting, for example; and the stepped portion 26 may be formed not through the post-processing but through molding by casting, or the like.

In this manner, in the valve device 10 of the present embodiment, each locking portion 52 of the fixing plate 30 is inserted into the engagement groove 40 provided in the outer circumferential surface of the small-diameter part 18 of each corresponding linear solenoid valve 14, and the locking portion 52 is engaged with the side walls 42 of the engagement groove 40, thereby setting the axial position of each linear solenoid valve 14; and the locking portion 52 is also engaged with the groove bottom 44 of the engagement groove 40, thereby setting the phase around the axial center S of each linear solenoid valve 14. This means that, with respect to each individual linear solenoid valve 14, simply by inserting the single locking portion 52 into the single engagement groove 40, it is possible to set the axial position and the phase around the axial center S of the linear solenoid valve 14 at the same time with a high accuracy. Simply by fixing the fixing plate 30 whose locking portions 52 are inserted in the engagement grooves 40 to the valve body 12, it is possible to carry out the fixation of the fixing plate 30 to the valve body 12 in a simple and inexpensive manner.

The assembly surface 28 of the valve body 12 is provided with the stepped portion 26, and the fixing plate 30 is disposed to the upper end surface 22. The level of the upper surface of the stepped portion 26 is defined at a position lower than the groove bottom 44 of each engagement groove 40, thus securely engaging (bringing) each locking portion 52 of the fixing plate 30 with (to abut against) the groove bottom 44 of each corresponding engagement groove 40 so as to set the phase around the axial center S. The lower part of each linear solenoid valve 14 on an opposite side to each engagement groove 40 is supported by the stepped portion 26 around the axial center S of each linear solenoid valve 14. Accordingly, the support range where the small-diameter part 18 of each linear solenoid valve 14 is supported by the valve body 12 becomes greater, so that the posture of each linear solenoid valve 14 becomes stable, thus fixing the linear solenoid valves 14 to the valve body 12 with a higher positioning accuracy.

The front end of each locking portions 52 is provided in a straight line, and the groove bottom 44 of each engagement groove 40 is also provided in a straight line in the longitudinal direction of the engagement groove 40; thus the front ends of the locking portions 52 and the groove bottoms 44 of the engagement grooves 40 are engaged in a straight line with each other, thereby appropriately setting the phase around the axial center S of each linear solenoid valve 14.

As the fixing member, the fixing plate 30 in a simple flat-platy shape is used, and is fixed to the valve body 12 in a manner as to be position-adjustable in a direction parallel with the fixing plate 30; therefore, the fixing plate 30 can be produced in a simple and inexpensive manner by press-punching, etc., and it is possible to securely engage (bring) the locking portions 52 with (to abut against) the groove bottoms 44 of the engagement grooves 40.

The front end surface of each locking portion 52 is composed of the side edge 50 of the fixing plate 30, a front end portion of the front end surface is machined through a post-processing such as shaving press so as to have a high profile accuracy, and thus burrs and or sags due to press-punching are removed, and the front end is engaged with the groove bottom 44 of the corresponding engagement groove 40, thereby setting the phase around the axial center S of each linear solenoid valve 14 with a high accuracy.

In the valve device 10 of the present embodiment, the multiple assembly holes 20 are formed in the valve body 12, the multiple linear solenoid valves 14 are assembled into the holes in parallel, and the multiple linear solenoid valves 14 are positioned and fixed by the single flat-platy fixing plate 30. Hence, the number of components can be reduced, and the fixing plate 30 can be produced by press-punching, thus configuring the valve device 10 having the multiple linear solenoid valves 14 in a simple and inexpensive manner as a whole.

The fixing plate 30 is provided with the multiple locking portions 52a to 52f along the straight portion of the side edge 50, and the locking portions 52a to 52f are locked to the engagement grooves 40 that are provided to the multiple linear solenoid valves 14a to 14f assembled in a straight line in a manner as to be arranged in a straight line in a direction vertical to the axial center S of each linear solenoid valve; therefore, it is possible to set the phases around the respective axial centers S of the multiple linear solenoid valves 14a to 14f with a high accuracy. Specifically, because of the simple arrangement shape of the multiple locking portions 52a to 52f that are arranged in a straight line along the straight portion of the side edge 50, it is easy to secure a mutual positioning accuracy among the locking portions 52a to 52f. In a case where the multiple linear solenoid valves 14a to 14f are fixed using individual different fixing members that are independently configured, the positioning accuracy among the linear solenoid valves 14 might vary due to error in dimension, error in fixation and the like among the multiple different fixing members. To the contrary, the fixing plate 30 is provided across the multiple linear solenoid valves 14a to 14f, thereby suppressing variation in positioning accuracy among the individual linear solenoid valves 14a to 14f.

As aforementioned, the embodiment of the present disclosure has been described in details with reference to the drawings, but this is merely one embodiment, and the present disclosure can be implemented in various modifications and improvements based on knowledge of those skilled in the art.

The valve device of the present disclosure is preferably used for a hydraulic control circuit of a vehicle automatic transmission in which gears are shifted by a hydraulic actuator or the like, for example, and may also be used for another hydraulic control circuit for a vehicle, or various hydraulic control circuits such as a hydraulic control circuit other than for a vehicle and a pneumatic pressure control circuit. The solenoid component includes a solenoid for a valve driving that is excited by an ON-OFF control or a duty control with excitation current so as to generate a predetermined electromagnetic force; and for example, as the solenoid component, there may be employed a solenoid valve such as a linear solenoid valve in which each valve element such as a spool is integrally incorporated, and there may also be employed a solenoid component in which each valve element such as a spool is directly provided to a valve body so that the solenoid component is equipped with only a valve driving unit such as a solenoid. An example of the solenoid valve includes a selector valve or an on-off valve to reciprocatingly move each spool in an axial direction so as to switch an oil passage, and a regulated valve to control an oil pressure by urging each spool by a predetermined electromagnetic force. The solenoid component is formed into a stepped cylindrical shape including a large-diameter part and a small-diameter part, for example, and the small-diameter part is inserted into each corresponding assembly hole provided to the valve body, but there may also be employed a solenoid component in a cylindrical shape having a substantially constant outer diameter dimension. Each assembly hole formed in the valve body may be a bottomed hole or a through-hole having a cross section in a circular shape, for example.

As the fixing member, a flat-platy fixing plate is preferably used, for example, but there may also be employed various types of fixing members, such as a fixing member having each locking portion bent into a crank shape and a fixing member whose fixing portion to be fixed to the valve body is bent into an L shape. The fixing member is provided with the fixing holes as fixing portions, for example, and the fixing member is fixed to the valve body by bolts inserted through the fixing holes; but there may also be employed various fixing ways, such as fixing the fixing member to the valve body using clips composed of, for example, spring plates, and configuring the fixing member itself by a spring plate or the like so as to fix the fixing member to the valve body in an one-touch operation like a clip.

The engagement groove formed in the outer circumferential surface of each solenoid component is preferably provided in a straight line in a direction orthogonal to the axial direction, but may be formed in a direction inclined relative to the direction orthogonal to the axial direction, or there may also be provided engagement grooves each of which is curved or bent as viewed from the outer circumferential side. The groove bottom of each engagement groove is preferably provided in a straight line in the longitudinal direction of the engagement groove, but may be provided in any shape at least except for an arc shape around the axial center, and may also be provided in a curved shape in order to set the phase around the axial center. The shape of each locking portion of the fixing member to be inserted and engaged with each corresponding engagement groove is appropriately defined depending on the longitudinal shape of each engagement groove and the shape of each groove bottom. The shape of the front end of each locking portion is defined to be engageable with the groove bottom across the entire longitudinal length of each corresponding engagement groove, for example; but each locking portion may be engageable with the groove bottom of a part of each corresponding engagement groove in the longitudinal direction, or the locking portions may be engaged with the engagement grooves at multiple positions with intervals in the longitudinal direction in a range to set the phase around the axial center of the solenoid components.

The axial positions of the solenoid components are specified by the engagement between each locking portion of the fixing member and the pairs of side walls of each corresponding engagement groove, but the axial positions may vary in a predetermined allowable range, and there may be provided a predetermined gap (play) between each locking portion and the pair of side walls. The phase around the axial center of each solenoid component is specified by the engagement between each locking portion of the fixing member and the groove bottom of each engagement groove, but the phase around the axial center of each solenoid component may vary within a predetermined allowable range, and there may be provided a predetermined gap (play) between the front end of each locking portion and each groove bottom.

In the second embodiment, the valve body is provided with the relief step, but in the first disclosure, it is not always necessary to provide the relief step, and the assembly holes may be formed in the flat assembly surface of the valve body in a manner as to expose to the outside an entire circumference of a portion where each engagement groove is formed. In the third embodiment, the front end of each locking portion is provided in a straight line, and the groove bottom of each locking groove is provided in a straight line in the longitudinal direction of the engagement groove, but in the first disclosure, they are not always necessary to be provided in a straight line.

In the fourth embodiment, the front end surfaces of the locking portions composed of the edge of the fixing plate are so defined as to have a higher profile accuracy than that of the other portions of the edge. This is because it is assumed to carry out press-punching, so that roughness due to burrs and sags are removed by the post-processing. Hence, depending on the material or the producing method of the fixing plate, the post-processing for increasing the profile accuracy may be omitted. In the fixing plate of the fourth disclosure, the position thereof is adjustable in a direction parallel with the fixing plate, so that the front ends of the locking portions can securely be engaged with (brought to abut against) the groove bottoms of the engagement grooves. As for means for allowing a positional adjustment, for example, it may be considered that in the case of inserting the bolts into the fixing holes to fix the fixing plate to the valve body, a predetermined play is provided to each fixing hole, or each fixing hole is configured to be a long hole. In another disclosure, in order to securely engage (bring) the locking portions with (to abut against) the groove bottoms of the engagement grooves, it is preferable to configure the fixing member to be fixed to the valve body in a position-adjustable manner, or to configure the locking portions to be engaged with the groove bottoms of the engagement grooves using elasticity of a spring plate or the like.

In the fifth embodiment, the valve body is provided with the multiple assembly holes so as to assemble the multiple solenoid components in parallel, but in another disclosure, it may be configured to simply assemble a single solenoid component into a single assembly hole. In the fifth disclosure, the multiple solenoid components are so assembled as to be arranged in a straight line in parallel, and the fixing plate having the multiple locking portions arranged along the straight edge is used; but there may be employed various manners, such as arranging the multiple solenoid components in a stepwise manner and using the fixing plate having the multiple locking portions at a stepwise edge thereof, and using individual fixing members for the multiple solenoid components so as to fix the individual fixing members to the valve body.

What is claimed is:

1. A valve device comprising:
   a valve body having assembly holes;
   solenoid components configured such that a first part that is a part of each solenoid component is inserted into a corresponding assembly hole, an engagement groove being provided in an outer circumferential surface of each solenoid component in a direction orthogonal to a direction of an axial center of the solenoid component, each engagement groove being provided to a portion of the first part of a corresponding solenoid component that is located outside the assembly hole when the first part is inserted in the assembly hole; and
   a fixing member fixed to the valve body, the fixing member including locking portions, each of the locking portions being configured to be inserted into a corresponding engagement groove, side walls of each engagement groove being engaged with a corresponding locking portion so as to set a position in an axial direction of each solenoid component, and each locking portion being engaged with a groove bottom of the corresponding engagement groove so as to set a phase around the axial center of the corresponding solenoid component, wherein
   the valve body includes a stepped portion that is cutout from an engagement groove side in a radial direction of each of the assembly holes such that the engagement groove is exposed outside when the solenoid components are assembled to the valve body, the stepped portion is cutout such that an upper surface of the stepped portion is located closer to the axial center of each solenoid component than the groove bottom of the engagement groove when the solenoid components are assembled to the valve body through the fixing member.

2. The valve device according to claim 1, wherein
   a front end of each locking portion is provided in a straight line,
   the groove bottom of each engagement groove is provided in a straight line in a longitudinal direction of the engagement groove,
   and
   the front ends of the locking portions are engaged with the groove bottoms of the engagement grooves in a straight line.

3. The valve device according to claim 1, wherein
   the fixing member is a flat-platy fixing plate,
   the fixing member is fixed to the valve body such that a position of the fixing member in a planar direction parallel with the fixing plate is adjustable,
   an edge of the fixing plate includes a front end surface of each locking portion,
   and
   the front end surface of each locking portion has a higher profile accuracy than profile accuracy of portions other than the front end surface in the edge.

4. The valve device according to claim 1, wherein
   the valve body is provided with the assembly holes such that the axial directions of the assembly holes are parallel with one another,
   the valve body is provided with the assembly holes such that the axial centers of the assembly holes are arranged in a straight line,
   the assembly holes are configured such that the solenoid components are assembled into the assembly holes in parallel,
   the solenoid components are provided with the engagement grooves in a straight line in a direction vertical to the axial centers of the solenoid components,
   the fixing member is a flat-platy fixing plate provided with the locking portions arranged in a straight line along the edge,
   and
   the locking portions are locked to the engagement grooves of the solenoid components.

* * * * *